United States Patent
Morrow

(10) Patent No.: US 6,619,157 B1
(45) Date of Patent: Sep. 16, 2003

(54) FLUID ACTUATED SYSTEM FOR BALANCING OF LOADS IN MULTI-PATH GEARED TRANSMISSIONS

(76) Inventor: William Bruce Morrow, 549 LaMarina Dr., Santa Barbara, CA (US) 93109

( * ) Notice: Subject to any disclaimer, the term of this patent is extended or adjusted under 35 U.S.C. 154(b) by 0 days.

(21) Appl. No.: 09/887,892

(22) Filed: Jun. 25, 2001

(51) Int. Cl.[7] .............................................. F16H 37/06
(52) U.S. Cl. .................................... 74/665 GD; 74/410
(58) Field of Search ........................ 74/665 F, 665 G, 74/665 GD, 410, 457

(56) References Cited

U.S. PATENT DOCUMENTS

| | | | | |
|---|---|---|---|---|
| 1,157,918 A | * | 10/1915 | Alquist | 74/410 |
| 1,351,317 A | * | 8/1920 | Alquist | 74/410 |
| 1,458,131 A | * | 6/1923 | Davis | 74/410 |
| 1,898,198 A | * | 2/1933 | Lysholm | 74/410 |
| 2,231,784 A | * | 2/1941 | Thungen | 74/410 X |
| 2,386,367 A | * | 10/1945 | Taylor | 74/410 |
| 2,899,822 A | * | 8/1959 | Matthews | 74/410 X |
| 3,034,369 A | * | 5/1962 | Marchand | 74/410 |
| 4,361,058 A | * | 11/1982 | Witt | 74/410 X |
| 4,784,234 A | * | 11/1988 | Naito et al. | 74/410 X |

FOREIGN PATENT DOCUMENTS

| | | | | |
|---|---|---|---|---|
| JP | 357200747 | * | 12/1982 | 74/410 |
| JP | 358113650 | * | 7/1983 | 74/410 |

* cited by examiner

*Primary Examiner*—Charles A. Marmor
*Assistant Examiner*—Ha Ho
(74) *Attorney, Agent, or Firm*—Dennis B. Haase

(57) ABSTRACT

A geared transmission having multiple power paths in which each of the power paths are operatively connected to a fluid chamber. Input gears on each of the power paths are axially moveable on a jack shaft in response to loading on the power paths. A fluid chamber is operatively connected to each of the input gears such that movement of an input gear results in a change of pressure in the fluid chamber, and that change in pressure is communicated to all other power paths in the transmission to balance the loading between and among all of them.

10 Claims, 2 Drawing Sheets

FLUID ACTUATED SYSTEM FOR BALANCING OF LOADS IN MULTI-PATH GEARED TRANSMISSIONS

The present invention relates generally to transmissions having multiple power paths, and, more particularly, to such transmissions in which a balance is effected between the power transmitted by and between the various paths so as to evenly distribute loads therebetween.

BACKGROUND OF THE INVENTION

1. Field of the Invention

Inherent in multiple power path geared transmissions is an imbalance in the power to be transmitted through each path. Fault lies not in the design, but in the manufacture.

There are practical limits on the manufacturing tolerances that can be achieved before costs accelerate and greatly exceed the benefits to be realized. Such tolerances may result in variations in gear diameter, root diameter, pitch circle diameter, and even tooth shape, depending on the hobbing device.

Efforts to balance the loading between power paths have been ongoing since at least the very early 1900's when transmissions were used to drive multiple screws on ocean going vessels. As transmissions evolved, they became smaller in size, but carried ever increasing loads, thereby making multiple paths more imperative and the balancing of loading among such paths essential.

2. Overview of the Prior Art

While there are myriad theories on the most effective approach to balancing loading between multiple paths in geared transmissions, most recently, advantageous use of the inherent characteristics of helical gears to respond to torsional loading by the creation of a force vector which is co planer with the axis of rotation of the gear. More specifically, by permitting helical gears limited axial movement on their respective shafts, allows those gears to respond to such force vector by axial movement to arrive at a balance between power paths. My recently issued U.S. Pat. No. 5,927,147 is exemplary of this group of prior art efforts.

Reference is also made to Matthews U.S. Pat. No. 2,899,822 for a recognition of, and interesting exploration of, the theory of the proportionate relationship between torque and power transmitted in a helical gear transmission.

Others have explored other avenues and have determined, for example, that flexible gearing, or flexible mounting of gears, is a means of accomplishing balance between multiple power paths, and exemplary of this group of U.S. Pat. Nos. 1,502,199 and 1,591,826 to Hodgkinson, and U.S. Pat. No. 1,320,459 to Edwards. Still others opine that permitting limited movement of the quill, or jack shaft itself, is the solution, and evolving from that concept is, among others, U.S. Pat. No. 4,266,436 to Reppert.

Eggins U.S. Pat. No. 3,545,296 is of interest in that it uses a flexible diaphragm to control the spacing between halves of a split gear.

A significant number of transmissions attempt to take advantage of these principals, as well as others, including the simplistic use of basic laws of physics relating to action and reaction to the application of forces between gears, and particularly helical gears, all in an effort to balance loading and, with it, wear in multi path geared transmissions.

Finally, there is a line of patents in which advantageous use of the relationship between fluid pressure and power transmitted is embodied in a geared transmission. Interestingly, these patents seem to focus on the aircraft industry. For example, in Taylor U.S. Pat. No. 2,386,367 layshafts are subjected to fluid under pressure delivered to an end of each by a pump so as to displace the shaft by an amount sufficient to deliver the desired power. The Matthews '822 patent, referenced above, has a similar vision, employing pump 56 to create pressure.

In Parenti U.S. Pat. No. 3,648,533, a spring loaded piston behind each shaft creates pressure, and Marchand Pat. No. 3,034,369 is similar in concept. There is an area of commonality among these patents, and that is that a system for creating the desired positive operating pressure is in place to develope the desired pressure/load ration, which is distinguishable from the present invention in which a passive system simply equalizes pressure among the several load carrying paths.

SUMMARY OF THE INVENTION

The geared transmission of the present invention is characterized by multiple power paths, which power paths are in communication with one another via a discrete fluid path. The fluid is sensitive to imbalance in the loading on the various power paths and, via the communication between them, effects an appropriate balance.

Accordingly, it is an objective of the present invention to effect a balance of loads on the various power paths which comprise a geared transmission. It is an objective of the present invention, incident to the foregoing, to effect balanced loading in a smooth, yet rapid manner.

Another objective of the present invention is to accomplish balanced loading between and among various power paths in an exceedingly efficient and economical manner, and a related objective is to accomplish the foregoing in a fashion which minimizes wear and damage to the geared components of the transmission.

Another and still further objective is to create a passive fluid environment in which increases in forces on one power path are sensed and balanced with companion power paths.

The foregoing, as well as other objects and advantages of the present invention, will become more apparent from a reading of the Detailed Description of a Preferred Embodiment of the Present Invention, taken in conjunction with the accompanying drawings, wherein:

DETAILED DESCRIPTION OF A PREFERRED EMBODIMENT

Figure 1:
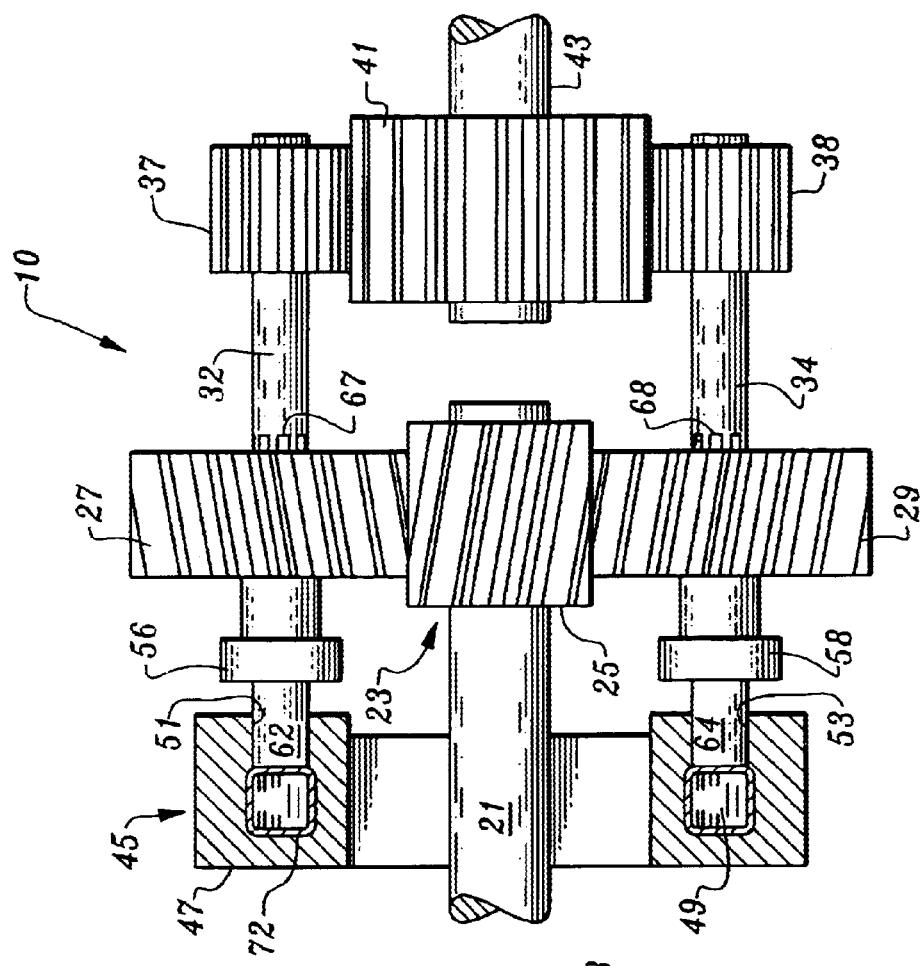
FIG. 1 is a schematic interpretation of an array of shaft mounted gears comprising the working components of a multi path, in this instance four such paths, transmission of the type embodying the elements of the present invention.
Figure 2:
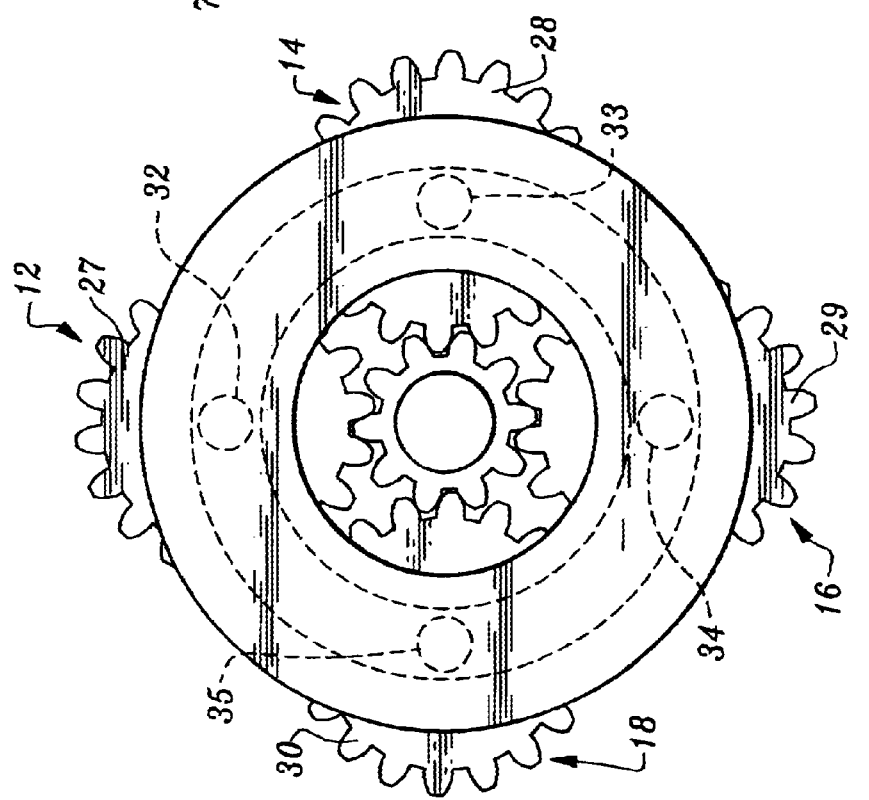
FIG. 2 is an end view of the transmission of FIG. 1, illustrating the interrelationship of the various power paths to the fluid communication system of the present invention.

Reference is made initially to FIGS. 1 and 2, where a typical simple multi path transmission 10 is depicted. In this illustrative case, four power paths are shown and will be referenced, generally, in clockwise order as 12, 14, 16 and 18, best seen in FIG. 2.

Power from the power source, which may be any one of a number of recognized devices, may vary depending on whether a step up or step down transmission is envisioned. For purposes of illustration only, input shaft 21 is shown as having an input pinion 23. The pinion 23 has an array of circumferentially helical teeth 25, which mesh with drive gears 27, 28, 29 and 30, respectively, on the power paths 12, 14, 16, and 18.

Figure 3:
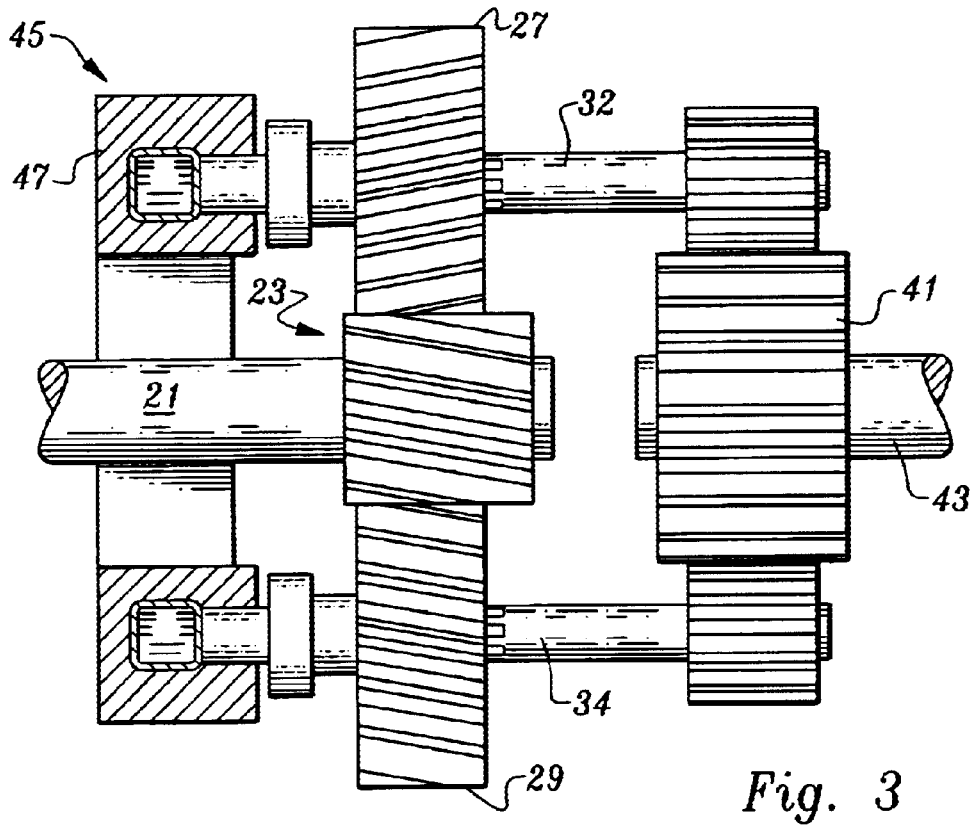
FIG. 3 is a view similar in concept to that of FIG. 1, illustrating the relative position of the power paths when the transmission is either in a dwell position with no loading, or where loading on the power paths is, for a variety of reasons, essentially balanced without recourse to the fluid balancing system of the present invention.
Figure 4:
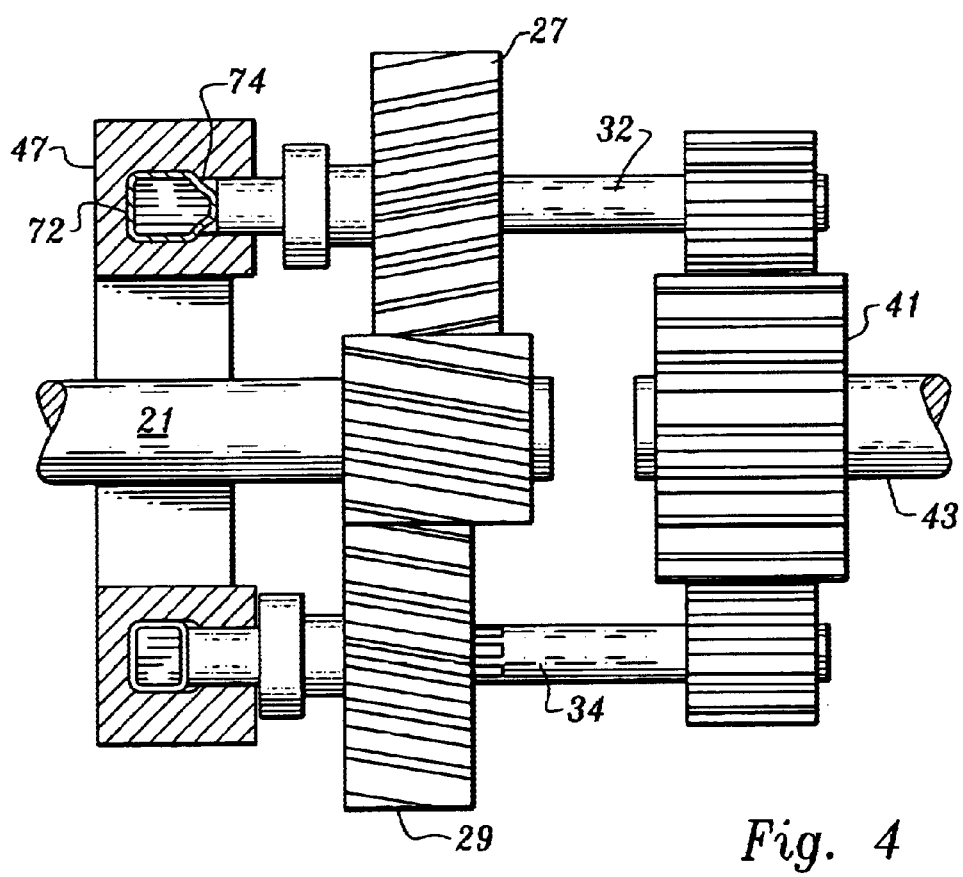
FIG. 4 is yet another view similar in visual depiction to FIG. 3, but illustrating the effect of the fluid balancing system on power paths which, for any one of several reasons, would, in the absence of the fluid balancing system, experience uneven power transmission.

By virtue of the orientation of the transmission as shown in FIG. 1, which is proportionate about horizontal and vertical axes, power paths 14 and 18 are effectively hidden in FIGS. 1, 3 and 4. Similarly, in FIGS. 1, 3 and 4, shafts 32 and 34 are illustrated. However, it will be appreciated that there are two additional power paths aligned behind the power paths containing shafts 32 and 34, which are not specifically illustrated. Further, transverse openings 51 and 53 are expressly illustrated, with the understanding that companion transverse openings accommodate shafts for power paths not expressly illustrated, and, similarly, thrust bearings 56 and 58 are illustrated with the express understanding that companion power paths not shown include substantially identical thrust bearings. It will be understood, however, that the diagram is purely illustrative and not intended to display every element, but rather a working embodiment in which power paths not expressly shown are merely duplicative. It will further be understood that the alignment and specific number of the power paths may be weighted to one axis or the other without materially effecting the resultant balancing system.

Each of the power paths 12, 14, 16, and 18 include a jack, or quill, shaft 32, which mounts gear 27; shaft 33, which mounts gear 28; shaft 34 which mounts gear 29, and shaft 35 which mounts gear 30.

In order, in keeping with the invention, to provide power output from the transmission, drive pinions are provided at a position on the shafts remote from the input gear, and, with reference to FIG. 1, drive pinions 37 and 38, secured, such as by keying, for example, are illustrative of the four such pinions, one of which is found on each of shafts 32, 33, 34, 35.

The drive pinions are in constant meshing engagement with an output gear 41, keyed, or otherwise affixed, to an output shaft 43 to deliver power to whatever device may by connected thereto.

An essential feature of the transmission 10 of the present invention is the ability to distribute and balance loading between and among the various power paths. To this end, and in keeping with the objectives of the present invention, there is provided a closed circuit passive fluid enhanced power balance system 45. The system contemplates the provision of a housing 47 in which a fluid retaining chamber, or passage, 49 is formed. By virtue of this specific orientation of the companion power paths, the passage is toroidal in configuration. It will be appreciated that the precise shape is a function of the orientation of the power paths in a given transmission.

The fluid retaining passage 49 is in a plane transverse to the plane of the power paths of the transmission. In order, in keeping with the invention, to provide pressure sensitive communication with the fluid contained in the passage, transverse openings 51 and 53 are formed in the housing 47 and are axially aligned with, respectively, shafts 32, 33, 34, and 35.

With specific, although not exclusive, attention to FIG. 4, it will be emphasized that it is an important feature of the present invention that changes in loading on the various power paths be transmitted to other such paths in a transmission via the fluid in the toroidal passage 49. As has been previously articulated in my Pat. No. 5,927,147, advantageous use of the characteristic of helical gears in multiple power paths to respond to uneven loading by moving axially to adjust the point of tooth contact between the gear, or pinion, which provides the power impetus, and the gear or pinion on the shaft which defines the power path.

The principal is exemplified in the drawings, and, still referring to FIG. 4, as power is applied to input pinion 23, by way of example, loading on the gear 29 urges that gear to the left. Each of the power paths includes and is integrally formed with; or otherwise provided a suitable thrust bearing coupling assembly, each of which is shown in symbolic form as 56 and 58. The assemblies terminate in ram ends, 62 and 64, which are reciprocally mounted in openings 51 and 53 and operatively connected with the associated jack shafts for axial movement in unison therewith. The coupling separates the rotating shaft and associated gear from the ram ends with a bearing which permits lateral motion to be transmitted to the ram ends without it being'simultaneously rotated. Thus, unnecessary wear on the ram end and the associated fluid chamber is eliminated.

More specifically, the gears 27 through 30 are splined at 67 and 69, in order that the gears may have limited axial freedom to move on their respective shafts in response to loading on the power path of which they are a part, and, with it, the associated thrust bearing coupling assembly. The ram end 64, guided in the opening 53, presses against the fluid contained in the passage 49 to facilitate the application of pressure to the fluid in passage 49, which fluid is preferably incompressible.

In furtherance of this aspect of the invention, it is contemplated that a predetermined volume of fluid be encased, such as in a sheath like membrane 72. The sheath is so constructed as to be flexible, at least at the point of engagement with each of the openings 51 and 53, in order that the increased pressure exerted thereon by the ram end as it moves to the left, as seen in the drawings, or away from the passage, as the case may be, is at least proportionally transmitted to the fluid. Because the fluid volume is constant and the system is closed, any variation in pressure is instantaneously and directly experienced throughout the system and applied to the ram ends of each of the companion power paths.

It will be appreciated that alternative means of containing the fluid within its chamber is contemplated without departure from the essential aspects of the invention, so long as the effective, at least proportionate pressures are introduced into and are transmitted by, the fluid within the toroidal chamber.

Still referring to FIG. 4, with the ram end 64 forced to the left by the loading on the gear 29, the sheath 72 is squeezed, or compressed, thereby increasing fluid pressure in this closed system. The pressure is increased proportionately throughout the system, as illustrated in somewhat exaggerated form by the bulge at 74, resulting in an increase in pressure at openings 51 and 53, producing an axial force on each of couplings 56 and 58, tending to move those thrust bearings to the right until the counter force represented by the fluid in the sheath is equalized. The input gear 27, the position of which is also somewhat exaggerated in FIG. 4, is illustrative of this result. At that point, the loading on all of the power paths has been equalized, and the objectives of the invention have been achieved.

It will be appreciated that there may be variations in the loading on more than one power path. Indeed, each of the power paths may, by virtue of any number of variables, including manufacturing tolerances, wear and the like, exhibit a significant variation in loading. Accordingly, upon initial application of power, each of the thrust bearings may move to the right or left, exerting, or relieving, pressure on the fluid in the toroidal passage. Because the fluid, which may be of any stable commodity not materially effected by temperature or pressure, will respond to such variations in pressure by stabilizing the pressure within the sheath and transmit such resultant pressure to all of the power paths, the loading between and among such paths is equalized, and, again, the objectives to be accomplished by the present invention are realized.

Having thus described, in considerable detail, a preferred embodiment of the present invention, it will now be appreciated, that some variation in the specific structure is within the contemplation of the invention, and the claims, wherein.

What is claimed is:

1. In a geared transmission having multiple power paths in which a power input pinion engages, in driving relation, an input gear on each of said power paths;

each said power path including a jack shaft, said input gear for each said power path being mounted to said jack shaft for rotation therewith, and for limited axial movement thereon;

a thrust bearing coupling assembly a said thrust bearing coupling assembly being disposed on each of said jack shafts of said power paths; a housing, said housing so positioned relative to said power paths as to circumscribe at least a portion of each of said thrust bearing coupling assembly;

a stationery chamber in said housing, a membrane provided in said chamber a fluid encased in said membrane, said fluid being substantially incompressible; said chamber in pressure sensitive contact with each said power path;

each said thrust bearing coupling assembly being in pressure transmitting contact with said fluid in said chamber, such that axial movement of any of said input gears on a said power path results in an increase or decrease in the pressure of said fluid in said chamber.

2. The geared transmission of claim 1, wherein said chamber is toroidal in configuration.

3. The geared transmission of claim 1, wherein said thrust bearing coupling assembly being operatively connected with said jack shaft so as to be axially moveable in response to axial movement of said jack shaft.

4. The geared transmission of claim 1, wherein each said power path includes a ram end; said ram end being axially move able in unison with axial movement of said jack shaft of each said power path; said ram end being in touching engagement with said chamber such that movement thereof into said membrane increases fluid pressure therein.

5. The geared transmission of claim 1, wherein said housing is formed with a plurality of transverse openings, said openings being aligned with said power paths, said transverse openings providing access to said chamber by said power paths.

6. The geared transmission of claim 1, wherein said thrust bearing coupling assembly being operatively connected with said input gear so as to be axially moveable in response to axial movement of said input gear.

7. The geared transmission of claim 1, wherein each said power path includes a ram end, said ram end being axially moveable in unison with axial movement of said jack shaft; said ram end being in touching engagement with said chamber such that movement thereof into said membrane increases fluid pressure therein.

8. In a geared transmission having multiple power paths in which a power input pinion engages, in driving relation, an input gear on each of said power paths;

each said power path including, in serial relation, a jack shaft, said input gear for each said power path being mounted to said jack shaft for rotation therewith, and for limited axial movement thereon;

a housing, said housing so positioned relative to said power paths so as to be transverse thereto;

a chamber in said housing, a membrane provided in said chamber and a fluid encased in said membrane, said fluid being substantially incompressible;

transverse openings in said housing; said transverse openings being in axial alignment with said power paths such that said power paths are in touching engagement with said chamber, such that axial movement of any of said input gears on a said power path results in an increase or decrease in the pressure of said fluid in said chamber.

9. The geared transmission of claim 8, wherein said chamber is toroidal in configuration.

10. The geared transmission of claim 8, wherein each said power path includes a ram end; said ram end being axially moveable in unison with axial movement of said jack shaft; said ram end being in touching engagement with said chamber such that movement thereof into said membrane increases fluid pressure therein.

* * * * *